United States Patent
Ishihara et al.

(10) Patent No.: US 6,772,378 B1
(45) Date of Patent: Aug. 3, 2004

(54) DUMMY ERROR ADDITION CIRCUIT

(75) Inventors: Kenichi Ishihara, Yokosuka (JP); Kenichi Shiraishi, Yokohama (JP); Soichi Shinjo, Machida (JP); Akihiro Horii, Zama (JP)

(73) Assignees: Kabushiki Kaisha Kenwood, Tokyo (JP); Kenwood TMI Corporation, Kanagawa (JP)

( * ) Notice: Subject to any disclaimer, the term of this patent is extended or adjusted under 35 U.S.C. 154(b) by 0 days.

(21) Appl. No.: 09/807,029
(22) PCT Filed: Nov. 11, 1999
(86) PCT No.: PCT/JP99/06295
§ 371 (c)(1),
(2), (4) Date: Apr. 9, 2001
(87) PCT Pub. No.: WO00/28709
PCT Pub. Date: May 18, 2000

(30) Foreign Application Priority Data

Nov. 11, 1998 (JP) .......................... 10-321086

(51) Int. Cl.$^7$ ................................ G06F 11/00
(52) U.S. Cl. ........................ 714/704; 714/703
(58) Field of Search .................. 714/703, 704, 714/706, 819, 701, 799, 811

(56) References Cited

U.S. PATENT DOCUMENTS 5,534,827 A * 7/1996 Yamaji ................... 332/103
5,809,420 A * 9/1998 Ichiyanagi et al. ......... 455/103

FOREIGN PATENT DOCUMENTS

| JP | 49-098508 | 9/1974 |
| JP | 57-174958 | 10/1982 |
| JP | 01-109839 | 4/1989 |
| JP | 06-046105 | 2/1994 |
| JP | 08-242259 | 9/1996 |
| JP | 09-135274 | 5/1997 |

* cited by examiner

Primary Examiner—Christine T. Tu
(74) Attorney, Agent, or Firm—Eric J. Robinson; Robinson Intellectual Property Law Office, P.C.

(57) ABSTRACT

A dummy error addition circuit for adding a dummy error to an orthogonal modulation symbol data, wherein a value based on a specified bit error rate is loaded to count clock signals at a counter (11), a carrier of the counter (11) stores outputs from a PN data generator (21) in a shift register (22), outputs from a PN comparison circuit (3) when stored data agree with count values of the counter (11) are recognized as error pulses, a bit selector (40) randomly selects, on receiving error pulses and based on outputs from a PN data generator (41), bits to which to add errors in an orthogonal modulation data, e.g. a PSK modulation symbol data, at interval based on a bit error rate, and bits selected from the orthogonal modulation data are inverted in a bit inversion circuit (5) for outputting to thereby add errors.

4 Claims, 6 Drawing Sheets

FIG. 4

| 8PSK SEL | QPSK SEL | BPSK SEL | ERROR BIT SELECTION SIGNAL | ERR SEL0 | ERR SEL1 | ERR SEL2 |
|---|---|---|---|---|---|---|
| H | L | L | 00 | H | L | L |
| H | L | L | 01 | L | H | L |
| H | L | L | 1X | L | L | H |
| L | H | L | X0 | H | L | L |
| L | H | L | X1 | L | H | L |
| L | L | H | XX | H | L | L |

(a)

(b)

(c)

DUMMY ERROR ADDITION CIRCUIT

TECHNICAL FIELD

The present invention relates to a dummy error addition circuit, and more specifically, to a dummy error addition circuit that can generate, in simulation mode, a bit error that occurs in a transmission path so as to be used for a performance check of a decoder to decode an orthogonal modulation signal.

BACKGROUND ART

As a hierarchy transmission system that transmits a combination of a plurality of transmission systems with different reception C/N's in digital broadcasting, for example, a hierarchy transmission system using m-phase phase shift keying (PSK) modulation time multiplexing is known. This system allows stable digital signal transmission, but in the case where C/N deteriorates in a transmission path, this system cannot help being affected by noise due to bit errors.

For this reason, in order to test the performance of a decoder in a digital broadcasting receiver, there is a demand for a dummy error addition circuit, which generates, in simulation mode, a bit error that occurs in a transmission path, supplies orthogonal modulation symbol data with the dummy error being added to the decoder to test whether or not the decoder has a sufficient characteristic such as the error correction ability. However, there has never been such a dummy error addition circuit so far.

It is an object of the present invention to provide a dummy error addition circuit to add a dummy error to various orthogonal modulation symbol data such as PSK modulation symbol data and QAM modulation symbol data.

DISCLOSURE OF THE INVENTION

The dummy error addition circuit of the present invention adds a bit data error to orthogonal modulation symbol data, and according to the dummy error addition circuit of the present invention, a bit error is added to the orthogonal modulation symbol data, and therefore it is possible to check the performance of a decoder by supplying the orthogonal modulation symbol data with the dummy error added to the decoder.

The dummy error addition circuit of the present invention is provided with error pulse generating means for randomly generating error pulses at a rate based on a specified bit error rate and characterized by adding a bit error based on the error pulses. Therefore, according to the dummy error addition circuit of the present invention, error pulses are generated randomly at a rate based on a specified bit error rate and a bit error is added to the orthogonal modulation symbol data based on these error pulses, which makes it possible to simulate a bit error in a transmission path.

Furthermore, the dummy error addition circuit of the present invention is provided with bit selecting means for randomly selecting a bit to which to add an error from one bit in the orthogonal modulation symbol data and the bit position in the orthogonal modulation symbol data to which the error is added is selected randomly, and therefore it is possible to simulate bit errors in various transmission paths.

The dummy error addition circuit of the present invention is basically provided with counter means for periodically generating a series of monotonously increasing or decreasing numerical values, random signal generating means for generating a series of random number values, generating means for generating an error occurrence indication signal when the output values of the counter means and the random signal generating means for generating a series of random number values match as a result of a comparison and adding means for adding a bit error to a specific symbol data in an orthogonal symbol data series when the error occurrence indication signal is generated in response to the error occurrence indication signal, the orthogonal symbol data series and the error occurrence indication signal. Then, the random number values output from the random signal generating means are updated in the cycle of the series of numerical values output from the counter means, and the dummy error addition circuit of the present invention is also provided with means for selecting a bit to add an error from the bits in specific symbol data when the error occurrence indication signal is generated in response to the error occurrence indication signal, the random number value series and orthogonal modulation symbol data series and adding an error to this bit. This allows symbol data to add an error to be selected randomly in an average cycle (based on a bit error rate specified beforehand) from a predetermined orthogonal modulation symbol data series and allows the error to be added to a bit at a specific bit position randomly selected in the symbol data.

BRIEF DESCRIPTION OF THE DRAWINGS

FIG. 4 is a truth table in the modulation mode selection circuit in the dummy error addition circuit according to the embodiment of the present invention;

EMBODIMENTS

The dummy error addition circuit of the present invention will be explained according to an embodiment below.

Figure 1:
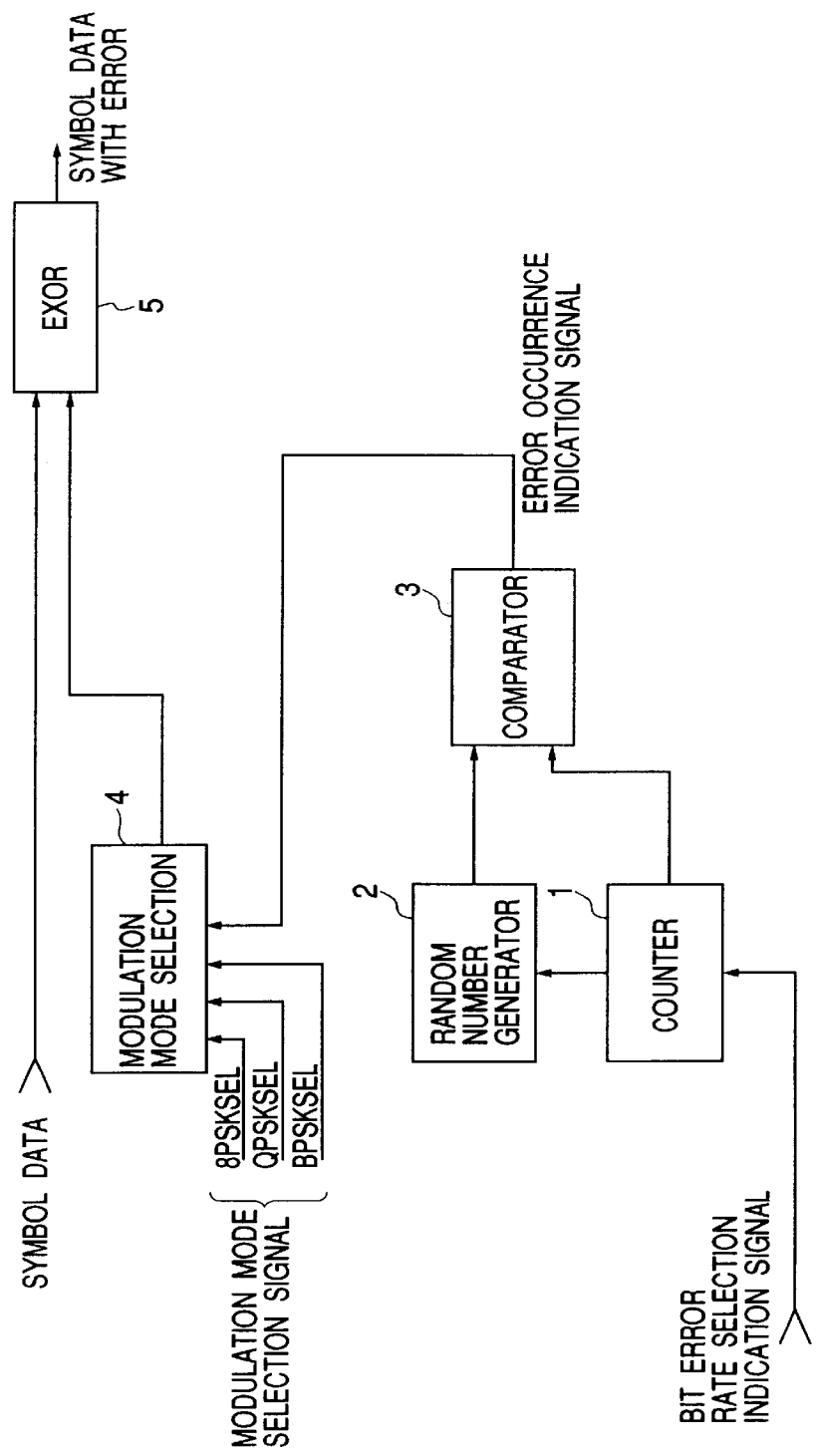
FIG. 1 is a block diagram showing a configuration of a dummy error addition circuit according to an embodiment of the present invention.

FIG. 1 is a block diagram showing a configuration of a dummy error addition circuit according to an embodiment of the present invention and illustrates a case where the dummy error addition circuit according to the embodiment of the present invention is configured to be applicable to cases of 8PSK modulation, QPSK modulation and BPSK modulation of orthogonal phase shift keying (PSK) modulation.

The dummy error addition circuit according to the embodiment of the present invention targets at PSK modulation symbol data and is intended to output the modulation symbol data with dummy errors randomly added. Digital broadcasting using the above-described hierarchy transmission system modulates a carrier with a predetermined frequency using PSK modulation symbol data obtained by adding an error correction code, which is external coding, to a broadcasting information signal such as a voice signal and data signal, interleaving the signal and applying convolution coding, which is internal coding, to the signal and this modulated signal is emitted into a radio transmission medium as a power supply. The present invention simulates generation of this error assuming bit errors of a digital signal caused by transmission deterioration (e.g., reduction of C/N) in this radio transmission medium.

As shown in the block diagram in FIG. 1, the dummy error addition circuit according to the embodiment of the present invention is provided with a variable counter 1 that receives a clock signal and bit error rate selection signal and sends a count value and carrier based on the bit error rate, a random number generator 2 that receives the carrier output from the variable counter 1 and sends a series of random number values and a comparator 3 that compares the count value output from the variable counter 1 and the random number value output from the random number generator 2 and outputs an error pulse as a signal indicating the timing of occurrence of an error when these two values match.

The dummy error addition circuit according to the embodiment of the present invention is further provided with a modulation mode selection circuit 4 that receives the error pulse and sends an inversion indication signal based on the indicated modulation mode and a bit inversion circuit 5 that receives the inversion indication signal and symbol data, selectively applies bit inversion to the symbol data and adds a dummy error thereto.

Figure 2:
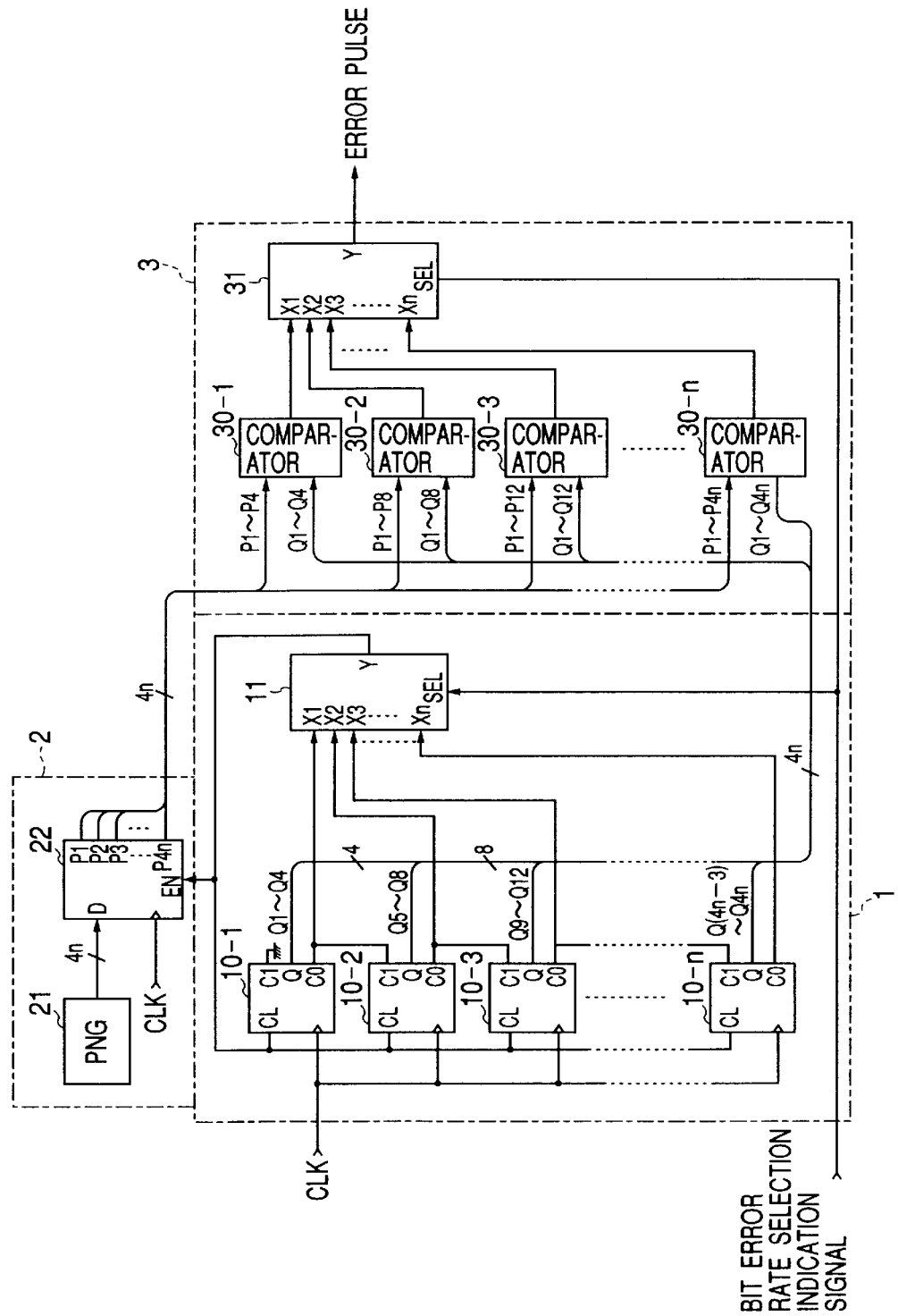
FIG. 2 illustrates a specific configuration example of a random number generator, a variable counter and a comparator in the dummy error addition circuit according to the embodiment of the present invention.

FIG. 2 illustrates a specific configuration example of the variable counter 1, the random number generator 2 and the comparator 3 that form a partial block (lower part) of the dummy error addition circuit shown in FIG. 1.

The variable counter 1 is configured by n 4-bit binary counters 10-1 to 10-n that performs counts 0 to $2^{4n}-1$ (maximum) in response to an input CLK as a whole and an n-input selector 11 that selects one of n inputs X1 to Xn according to a bit error rate selection indication signal (signals of codes 0, 1, 2, . . . , n corresponding to the error rate) and outputs as Y. Furthermore, the random number generator 2 is configured by a PN data generator (PNG) 21 that generates a series of 4n-bit pseudo-random numbers (PN) and a latch 22 that stores PN data output from the PN data generator 21, enabled by the carrier (carrier output from any one of the n binary counters) output from the selector 11 in the variable counter 1. Furthermore, the comparator 3 is made up of n 2-input comparators 30-1, 30-2, 30-3, . . . , 30-n (that operate in such a way as to generate a pulse when two input values match) that receives lower 4 bits, lower 8 bits, lower 12 bits., . . . , lower 4n bits of a binary 4n-bit signal output from the random number generator 2 and the n binary counters 10-1 to 10-n, respectively as inputs and an n-input selector 31 that selects one of the outputs of n comparators 30-1 to 30-n according to a bit error rate selection indication signal (code 1 to n) input and extracts the output as an error occurrence indication signal (error pulse). The circuit shown in FIG. 2 has a configuration assuming the case where one of $\frac{1}{2^4}, \frac{1}{2^8}, \frac{1}{2^{12}}, \ldots, \frac{1}{2^{4n}}$ is selected as the bit error rate. n 4-bit binary counters in the variable counter 1 are connected vertically so that a carrier output CO of one preceding stage is transmitted to a carrier input CI of another stage that follows and so on, forming a 4n-bit binary synchronous counter as a whole. At the time of a full count, the 4-bit binary counters 10-1, 10-2, 10-3, . . . , 10-n each output a carrier (here "L" signal) from their respective CO at the time of $2^4, 2^8, 2^{12}, \ldots, 2^{4n}$ count, respectively. Operation when error rate $\frac{1}{2^{12}}$ is selected will be explained below by way of example. In this case, a code "3" of the error rate selection indication signal is applied to the selector 11 in the variable counter 1 and the SEL terminal of the selector 31 in the comparator 3. At this time, a carrier from the CO of the binary counter 10-3 is selected by the selector 11 and extracted from Y thereof, then applied to the CL of all binary counters 10-1 to 10-n and at the same time this carrier is applied to the EN of the latch 22 in the random number generator 2. Therefore, the variable counter 1 ends the count at $2^{12}-1$ and is initialized (zero-count) at the next clock and then the same count is restarted. At the same time, the latch 22 in the random number generator 2 latches a new PN signal and outputs the PN signal to P1 to P4n. In this way, until the carrier output from the variable counter 1 is input, the latch 22 sends the PN data stored before the carrier is input. Thus, in the above example, after the variable counter 1 counts $2^{12}-1$, the latch 22 newly stores PN data output from the PN data generator 21 instead of the PN data stored previously.

Furthermore, in the comparator 3 the selector 31 in the comparator 3 selects the output of the comparator 30-3 (because code "3" is input to SEL of the selector 31). At this time, the lower bits P1 to P12 of the 4n-bit PN data output from the random number generator 2 and the lower 12 bits Q1 to Q12 of the 4n-bit count value output from n binary counters are input to the comparator 30-3. Therefore, the comparator 30-3 compares the 12-bit count value incremented for every clock input from 0 to $2^{12}-1$ and a 12-bit random number value (value of one of 0 to $2^{12}-1$) retained by the latch 22 for this count period.

Then, a pulse is output when both input values match once every $2^{12}$ times and that pulse is fetched as an error pulse via the selector 31.

Therefore, when the bit error rate is set to $\frac{1}{2^{12}}$, an error pulse is randomly output from the comparator 3 once every $2^{12}$ times on average. The same holds true with a case where another bit error rate is selected, for example, when the bit error rate is set to $\frac{1}{2^8}$ or $\frac{1}{2^{4n}}$, an error pulse is randomly output once every $2^8$ times (0 to $2^8-1$) or once every $2^{4n}$ times (0 to $2^{4n}-1$).

The above circuit configuration example uses a 4-bit binary counter, but it is naturally possible to use a decimal counter, and in this case, it is possible to set the bit error rate to any one of $\frac{1}{10^N}$ (N=1, 2, 3, . . . , n). In this case, an error pulse is randomly output once every $10^N$ (0 to 999 . . . 99) on average. In the example above, PNG that generates a PN signal, a pseudo-random number series, is used as the random number generator, but it is naturally possible to A/D-convert an analog noise signal generated by thermal noise and fetch a digital random number series.

Therefore, this means that the variable counter 1, random number generator 2 and comparator 3, as a whole, constitute error pulse generating means that randomly generates an error pulse at a specified bit error rate.

Figure 3:
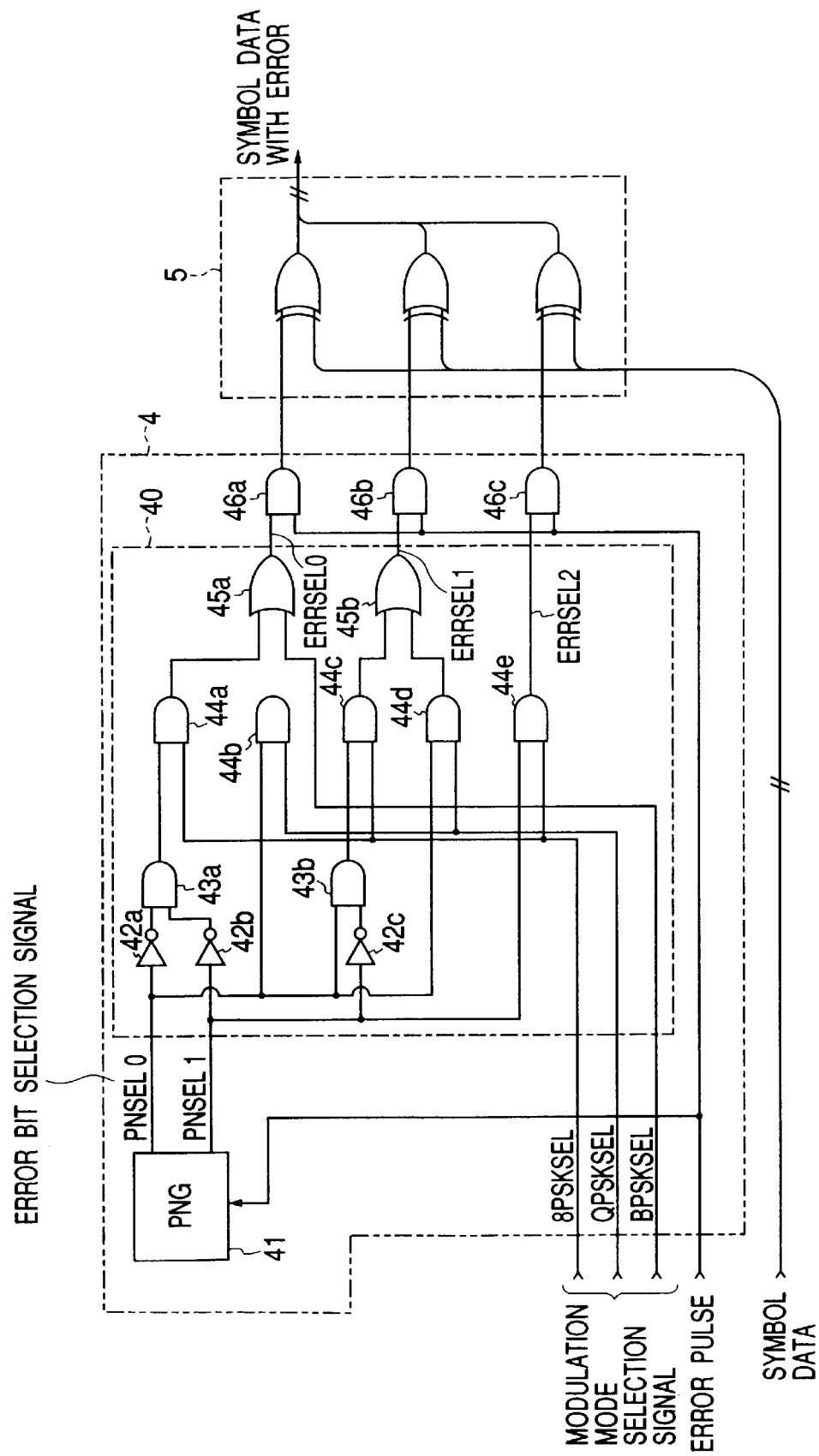
FIG. 3 illustrates a specific configuration example of a modulation mode selection circuit and a bit inversion circuit in the dummy error addition circuit according to the embodiment of the present invention.

As shown in FIG. 3, the modulation mode selection circuit 4 is configured by a PN data generator 41 that receives an error pulse and outputs an error addition bit selection signal (the error addition bit selection signal is also described as PNSEL1 and PNSEL0 and illustrate a case where 2 bits are used), which is PN data, a bit selector 40 that receives the PN data output from the PN data generator 41 and randomly selects a bit to add an error and AND gates 46a, 46b and 46c that receive the error pulse and the output from the bit selector 40 as inputs.

The bit selector 40 is provided with an inverter 42a that logically inverts the error addition bit selection signal PNSEL0, an inverter 42b that logically inverts the error addition bit selection signal PNSEL1, an inverter 42c that logically inverts the error addition bit selection signal PNSEL1, an AND gate 43a that carries out the logical AND between the output of the inverter 42a and the output of the inverter 42b and an AND gate 43b that carries out the logical AND between the error addition bit selection signal PNSEL0 and the output of the inverter 42c.

The bit selector 40 is further provided with an AND gate 44a that carries out the logical AND between an 8PSK selection signal (the 8PSK selection signal is also described as 8PSKSEL) and the output of the AND gate 43a, an AND gate 44b and 44d that carries out the logical AND between the error addition bit selection signal PNSEL0 and the QPSK selection signal (the QPSK selection signal is also described as QPSKSEL), an AND gate 44c that carries out the logical AND between the 8PSK selection signal and the output of the AND gate 43b and an AND gate 44e that carries out the logical AND between the error addition bit selection signal PNSEL1 and the 8PSK selection signal.

The bit selector 40 is further provided with an OR gate 45a that carries out the logical OR between the output of the AND gate 44a, the output of the AND gate 44b and the BPSK selection signal (the BPSK selection signal is also described as BPSKSEL), an OR gate 45b that carries out the logical OR between the output of the AND gate 44c and the output of the AND gate 44d, and the output of the OR gate 45a is sent to an AND gate 46a, the output of the OR gate 45b is sent to an AND gate 46b, the output of the AND gate 44e is sent to an AND gate 46c and an error pulse is output from the AND gates 46a, 46b and 46c whose gate has been opened.

Thus, the truth table of the modulation mode selection circuit 4 is as shown in FIG. 4. That is, when 8PSKSEL is selected by the 12 modulation mode selection signal and the error addition bit selection signals PNSEL1 and PNSEL0 are "00," this is the case where an error is added to the LSB of the 8PSK symbol data, and the output of the OR gate 45a becomes a high potential, the output of the OR gate 45b becomes a low potential, the output of the AND gate 44e becomes a low potential, and in this way only the AND gate 46a remains open, the LSB of the 8PSK symbol data remains selected, and thereby an error pulse is output from the AND gate 46a.

When 8PSKSEL is selected by the modulation mode selection signal and the error addition bit selection signals PNSEL1 and PNSEL0 are "01," this is the case where an error is added to the 2nd bit of the 8PSK symbol data, and the output of the OR gate 45a becomes a low potential, the output of the OR gate 45b becomes a high potential, the output of the AND gate 44e becomes a low potential, and in this way only the AND gate 46b remains open, the 2nd bit of the 8PSK symbol data remains selected, and thereby an error pulse is output from the AND gate 46b.

When 8PSKSEL is selected by the modulation mode selection signal and the error addition bit selection signals PNSEL1 and PNSEL0 are "1x" (x can be either "0" or "1"), this is the case where an error is added to the MSB of the 8PSK symbol data, and the output of the OR gate 45a becomes a low potential, the output of the OR gate 45b becomes a low potential, the output of the AND gate 44e becomes a high potential, and in this way only the AND gate 46c remains open and the MSB of the 8PSK symbol data remains selected, and thereby an error pulse is output from the AND gate 46c.

When QPSKSEL is selected by the modulation mode selection signal and the error addition bit selection signals PNSEL1 and PNSEL0 are "x0," this is the case where an error is added to the LSB of the QPSK symbol data, and the output of the OR gate 45a becomes a high potential, the output of the OR gate 45b becomes a low potential, the output of the AND gate 44e becomes a low potential, and in this way only the AND gate 46a remains open, the LSB of the QPSK symbol data remains selected, and thereby an error pulse is output from the AND gate 46a.

When QPSK is selected by the modulation mode selection signal and the error addition bit selection signals PNSEL1 and PNSEL0 are "x1," this is the case where an error is added to the MSB of the QPSK symbol data, and the output of the OR gate 45a becomes a low potential, the output of the OR gate 45b becomes a high potential, the output of the AND gate 44e becomes a low potential, and in this way only the AND gate 46b remains open, the MSB of the QPSK symbol data remains selected, and thereby an error pulse is output from the AND gate 46b.

When the BPSKSEL is selected by the modulation mode selection signal and the error addition bit selection signals PNSEL1 and PNSEL0 are "xx," the output of the OR gate 45a becomes a high potential, the output of the OR gate 45b becomes a low potential, the output of the AND gate 44e becomes a low potential, and in this way only the AND gate 46a remains open and an error pulse is output from the AND gate 46a.

In this way, an inversion indication signal is output from the modulation mode selection circuit 4. This inversion indication signal randomly indicates a bit to add an error based on the P data output from the PN data generator 41 and an error pulse is output to the indicated bit.

Therefore, the modulation mode selection circuit 4 constitutes the bit selecting means that randomly selects a bit to add an error from among bits in the symbol data based on the selected modulation mode at intervals based on the bit error rate based on the PN data output from the PN data generator 41.

As shown in FIG. 3, the bit inversion circuit 5 is provided with exclusive-OR circuits 51a, 51b and 51c that are supplied with symbol data and the output from the AND gate 46a, the output from the AND gate 46b and the output from the AND gate 46c are input, respectively and symbol data with only 1 bit inverted and an error added is output from the exclusive-OR circuits 51a, 51b and 51c.

Figure 5:
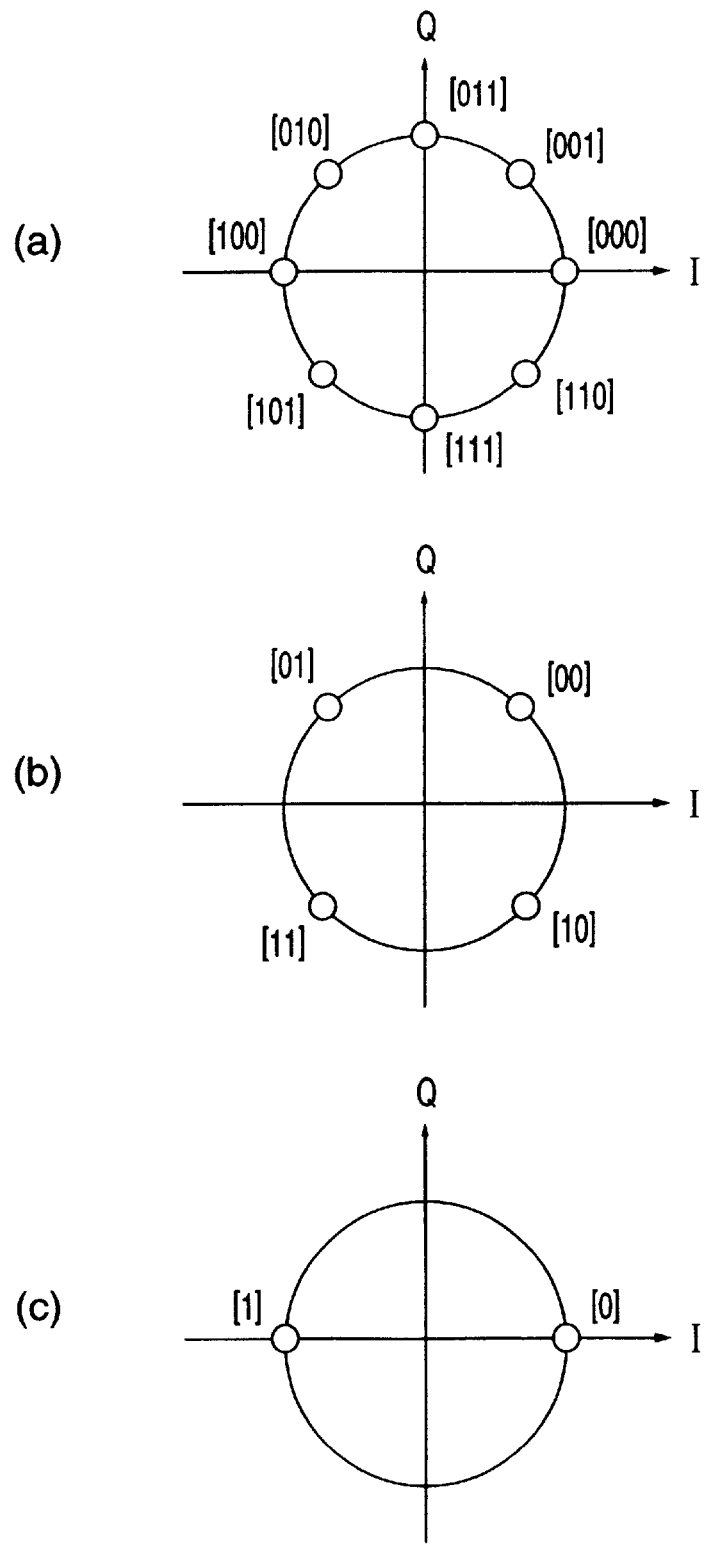
FIGS. 5(a)–(c) are explanatory drawings of a signal point layout of symbol data added to the dummy error addition circuit according to the embodiment of the present invention.
Figure 6:
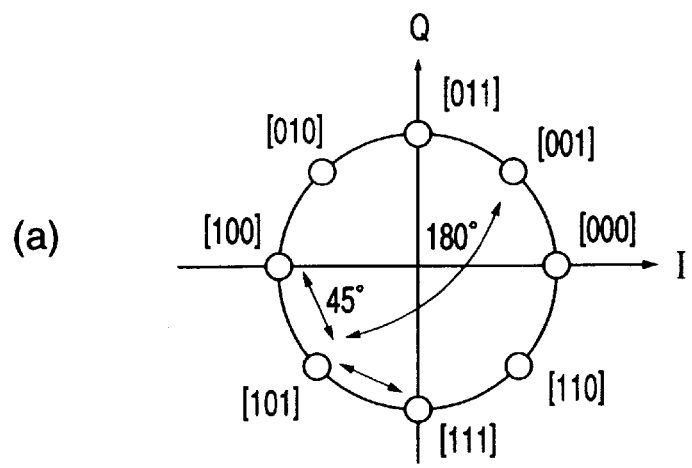
FIGS. 6(a)–(c) are explanatory drawings of actions of the dummy error addition circuit according to the embodiment of the present invention.
Figure 6:
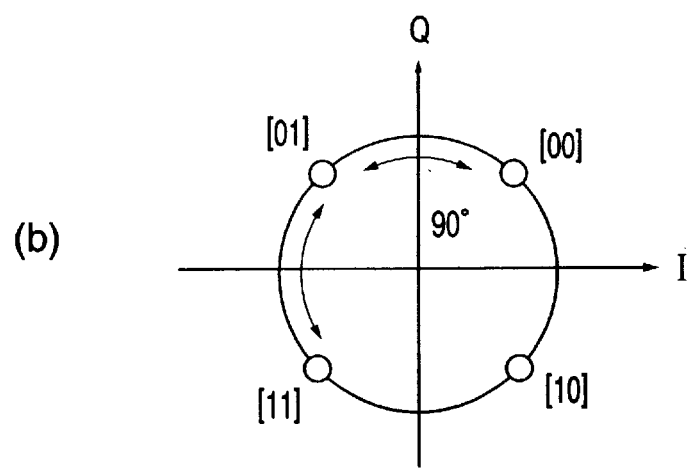
Figure 6:
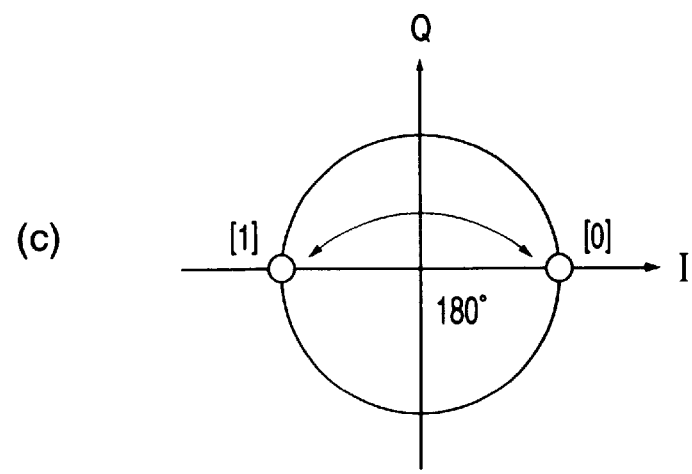

In the dummy error addition circuit according to the embodiment of the present invention, an 8PSK modulation baseband signal, which is symbol data, is mapped on a phase plane as shown in FIG. 5(a) and there are 8 ways of combination of bits (0,0,0), (0,0,1) to (1,1,1) that form symbols and these signals are converted to signal constellation 0 to 7 on an I-Q plane. Likewise, FIG. 5(b) shows a signal constellation of a QPSK modulation baseband signal and there are 4 ways of combination of bits (0,0), (0,1), (1,0) and (1,1) that form symbols and these are converted to signal constellation 0 to 3 on an I-Q plane. Likewise, FIG. 5(c) shows a signal constellation of a BPSK modulation baseband signal and there is a combination of bits (0) and (1) that form symbols and these are converted to signal constellation 0, 1.

Now, a case where an 8PSK modulation is selected and symbol data "101" is input will be explained as an example. In this state, when the error addition bit selection signal PNSEL1 and PNSEL0 are "1x," that is, when the MSB is selected, the MSB of the symbol data "101" is inverted and the symbol data becomes "001" with 1 bit carrying an error. On the other hand, when the error addition bit selection signal PNSEL1 and PNSEL0 are "01," that is, when the 2nd bit is selected, the 2nd bit of the symbol data "101" is inverted and the symbol data becomes "111" with 1 bit carrying an error. When the error addition bit selection signal PNSEL1 and PNSEL0 are "00," that is, the LSB is selected, the LSB of the symbol data "101" is inverted and the symbol data becomes "100" with 1 bit carrying an error. Similar estimation can be applied when other symbol data is input.

Now, a case where a QPSK modulation is selected and symbol data "01" is input will be explained as an example. In this state, when the error addition bit selection signal PNSEL1 and PNSEL0 are "x1," that is, when the MSB is selected, the MSB of the symbol data "01" is inverted and the symbol data becomes "11" with 1 bit carrying an error. On the other hand, when the error addition bit selection signal PNSEL1 and PNSEL0 are "x0," that is, when the LSB is selected, the LSB of the symbol data "01" is inverted and the symbol data becomes "00" with 1 bit carrying an error. Similar estimation can be applied when other symbol data is input.

Now, a case where a BPSK modulation is selected and symbol data "1" is input will be explained as an example. In this state, when the error addition bit selection signal PNSEL1 and PNSEL0 are "xx," the symbol data "1" is inverted to "0" with 1 bit carrying an error. On the other hand, when the symbol data "0" is input, the symbol data "0" is inverted to "1" with 1 bit carrying an error.

As explained above, the dummy error addition circuit according to the embodiment of the present invention randomly adds a dummy error to a bit randomly selected on a baseband signal at a set bit error rate without performing direct modulation. It is possible to check the performance of a decoder by supplying symbol data with a dummy error added to the decoder and make the decoder perform decoding. As a result, this embodiment allows effective design during the development of a receiver.

As shown above, the configuration and operation of the present invention has been explained by taking as an example, bit error addition to 8PSK, QPSK and BPSK symbol data according to the modulation system exclusively used in a digital broadcasting receiver. Application of the present invention, however, is not limited to bit error addition to multi-phase PSK symbol data. The technological scope of the present invention should not be limited to the above illustrative embodiments alone, but should be interpreted to be applicable to error addition to multi-value orthogonal modulation symbol data without departing from the principle thereof.

It goes without saying that the dummy error addition circuit according to the embodiment of the present invention is also applicable to a cellular telephone set.

INDUSTRIAL APPLICABILITY

As explained above, the dummy error addition circuit according to the present invention can add dummy errors to randomly selected bits on a baseband signal at a rate based on a set bit error rate and can therefore be used for a performance check of a decoder.

What is claimed is:

1. A dummy error addition circuit, characterized by:

counter means for periodically generating a series of monotonously increasing or decreasing numerical values;

random signal generating means for generating a series of random number values;

means for comparing the output value of said counter means and the output value of said random signal generating means to output an error occurrence indication signal when both the output values match with each other; and means in response to a predetermined orthogonal modulation symbol data series and said error occurrence indication signal for adding a bit error to specific symbol data in said orthogonal symbol data series when said error occurrence indication signal is generated.

2. The dummy error addition circuit according to claim 1, wherein the random number values output from the random signal generating means are updated in the cycle of the series of numerical values output from said counter means.

3. The dummy error addition circuit according to claim 2, wherein further comprising means in response to said error occurrence indication signal, random number value series and said orthogonal modulation symbol data series, for selecting a bit to add a bit error from bits in specific symbol data when said error occurrence indication signal is output and adding for an error to the selected bit.

4. A dummy error addition circuit for adding dummy errors to a given series of orthogonal modulation symbol data by reversing specific bits in the symbol data in timing according to a series of random number values, characterized by:

means for randomly selecting symbol data, to which an error is to be added from a given series of orthogonal symbol data at a rate based on a specified bit error rate;

means for randomly selecting at least one bit of a plurality of bits composing the randomly selected symbol data; and means for reversing the selected at least one bit of the selected symbol data.

* * * * *